(12) United States Patent
Wakashiro et al.

(10) Patent No.: US 6,717,683 B1
(45) Date of Patent: Apr. 6, 2004

(54) TARGET FOR PHOTOGRAMMETRIC ANALYTICAL MEASUREMENT SYSTEM

(75) Inventors: Shigeru Wakashiro, Tokyo (JP); Masato Hara, Tokyo (JP); Atsumi Kaneko, Tokyo (JP); Toshihiro Nakayama, Saitama (JP); Atsushi Kida, Saitama (JP); Masami Shirai, Saitama (JP); Kiyoshi Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/407,855

(22) Filed: Sep. 29, 1999

(30) Foreign Application Priority Data

| Sep. 30, 1998 | (JP) | 10-277333 |
| Oct. 2, 1998 | (JP) | 10-281004 |

(51) Int. Cl.$^7$ ................................................. G01B 11/14
(52) U.S. Cl. .................... 356/614; 396/14; 250/483.1; 348/137
(58) Field of Search ........................ 356/614, 620–622, 356/20–22; 396/14, 50, 89, 429, 661; 250/483, 483.1; 348/135, 137, 140

(56) References Cited

U.S. PATENT DOCUMENTS

| 5,148,591 A | * | 9/1992 | Pryor | 29/407.04 |
| 5,555,018 A | * | 9/1996 | von Braun | 348/144 |
| 5,603,318 A | * | 2/1997 | Heilbrun et al. | 600/426 |
| 5,642,293 A | * | 6/1997 | Manthey et al. | 702/42 |
| 5,699,444 A | | 12/1997 | Palm | |
| 5,732,474 A | * | 3/1998 | Cannon | 33/452 |
| 5,995,765 A | * | 11/1999 | Kaneko et al. | 396/89 |
| 6,108,497 A | * | 8/2000 | Nakayama et al. | 396/429 |
| 6,304,669 B1 | * | 10/2001 | Kaneko et al. | 382/154 |

FOREIGN PATENT DOCUMENTS

| JP | 6-241798 | 9/1994 |
| JP | 7-174563 | 7/1995 |
| JP | 9-113224 | 5/1997 |
| JP | 10170263 | 6/1998 |

* cited by examiner

*Primary Examiner*—Frank G. Font
*Assistant Examiner*—Sang H. Nguyen
(74) *Attorney, Agent, or Firm*—Greenblum & Bernstein, P.L.C.

(57) ABSTRACT

A target, which is photographed with an object at a spot for a photogrammtric analytical measurement, comprises first, second, third standard point members and assistant point members. The standard point members and the assistant point members are covered by a reflecting sheet. A distance between the first and second standard point members equals a distance between the second and third standard point members. Two assistant point members are positioned on a first straight line connecting the first and second standard point members. One assistant point member is positioned on a second straight line connecting the second and third standard point members. The distance between the first and second standard point members, the distance between the second and third standard point members, and an angle defined by the first and second straight lines, are predetermined.

6 Claims, 19 Drawing Sheets

TARGET FOR PHOTOGRAMMETRIC ANALYTICAL MEASUREMENT SYSTEM

BACKGROUND OF THE INVENTION

1. Field of the Invention

This invention relates to a target for use in a photogrammetric analytical measurement system, in which a survey map is produced on the basis of a set of photographed pictures obtained at two different photographing positions.

2. Description of the Related Art

For example, photogrammetry is carried out at a traffic accident spot. The traffic accident spot is photographed by a camera in at least two different positions, and a survey map of the traffic accident spot is produced based on a set of photographed pictures obtained at the different positions.

In particular, a two-dimensional coordinate system is defined on each of the photographed pictures, and two-dimensional positions of the objects, which are recorded on each picture, are determined by the two-dimensional coordinate system. Then, a three-dimensional coordinate system is defined on the basis of the two sets of two-dimensional coordinate systems, and three-dimensional positions of the recorded objects are determined from the three-dimensional coordinate system. Accordingly, it is possible to produce a survey map of the traffic accident spot by drawing the objects on a sheet of paper in such a manner that the objects are projected on one of the three planes defined by the three-dimensional system.

Before accurately scaled distances and lengths can be reproduced on the survey map, a standard measurement scale must be recorded together with the objects in the photographed pictures. Also, a standard reference plane, on which the survey map should be drawn, must be defined in the photographed pictures.

Usually, in order to define the standard measurement scale and the reference plane, three respective cone-shaped markers, which are identical to each other, are positioned at suitable locations around a traffic accident spot. Namely, a distance between two apexes of the cone-shaped markers is measured, for example, with a measuring tape, and set as the standard measurement scale, and a plane, defined by the three apexes of the cone-shaped markers, is utilized as the reference plane. As the positioning of the cone-shaped markers and the measurement of the distance between the two apexes are performed by operators, a process of preparing for photographing is onerous and requires a lot of time.

In order to solve the above mentioned problems, photogrammetric analytic measurement, using a target which has a triangular frame instead of the three cone-shaped markers, is disclosed in Japanese Unexamined Patent Publication (Kokai) No. P10-170263. Standard point members are respectively mounted on each of three apexes of the target. A distance between the standard point members is set as the standard measurement scale, and a plane defined by the standard point members is utilized as the reference plane. A reflecting sheet, for example, is attached on the standard point members so that the standard point umbers can be viewed easily in photographed pictures.

However, if photogrammtric analytic measurement is performed under condition in which an amount of luminance is not ideal for photographing, for example, in rain or at nighttime, or at a spot, in which a surface of a road reflects incident light, the standard point members can not be viewed clearly in photographed pictures. Accordingly, the standard measurement scale and the reference plane are not accurately determined, and thus the photogrammetric analytic measurement can not be performed accurately.

The determination of the three-dimensional positions of the recorded objects from the three-dimensional coordinate system is carried out by iterating a series of approximate calculations, using a computer having a monitor on which the set of photographed pictures is displayed.

Initially, before a first series of approximate calculations is executed, the apexes of the cone-shaped markers and a suitable point on one of the recorded objects in the set of photographed pictures displayed on the monitor are selected with a cursor, by manipulating a mouse, whereby three sets of two-dimensional coordinates, corresponding to the apexes of the cone-shaped markers, and a set of two-dimensional coordinates on the suitable point of the selected object are inputted to the computer. Namely, the execution of the first series of approximate calculations is based upon the inputted two-dimensional coordinates of the apexes of the cone-shaped markers and the inputted two-dimensional coordinates of the suitable point on the selected object, thereby determining three-dimensional positions of the apexes of the cone-shaped markers and a three-dimensional position of the suitable point of the selected object from the three-dimensional coordinate to system.

Then, another suitable point on the selected object in the set of photographed pictures displayed on the monitor is indicated with the cursor, by manipulating the mouse, whereby a set of two-dimensional coordinates of the other suitable point on the selected object is inputted to the computer, and a second series of approximate calculations is executed on the basis of the inputted two-dimensional coordinates of the other suitable point on the selected object, thereby determining a three-dimensional position of the other suitable point on the selected object from the three-dimensional coordinate system. This procedure is continued until a sufficient number of points on the selected object are indicated, to thereby specify a three-dimensional profile of the selected object.

The aforementioned series of approximate calculations is executed based on positional data of the camera at which the pictures are photographed. The positional data of the camera includes a distance from the camera to the selected object, an angle of the camera against the object. Accordingly, at the traffic accident spot, it is necessary for an operator to measure and record such positional data.

However, it is onerous to measure the positional data of the camera every time a picture is photographed. Further, the measurement of the positional data of the camera requires a great deal of time and labor. On the other hand, the photogrammetry at the traffic accident is required to be rapidly performed. Accordingly, it is difficult to obtain an accurate positional data of the camera at a photogrammetry spot, such as the traffic accident spot.

Further, before the three-dimensional profile of the selected object can be properly specified and produced, each of the suitable points on the selected object must be precisely indicated with the cursor, by an operator's manipulation of the mouse. Nevertheless, the indication of the suitable points on the selected object with the cursor, by the operator's manipulation of the mouse, cannot always be carried out in a precise manner. Of course, unless the precise indication of the suitable points on the selected object can be ensured, the selected object cannot be accurately drawn on the survey map Namely, sufficient work efficiency and accuracy of the photogrammetry can not be obtained.

SUMMARY OF THE INVENTION

Therefore, an object of the present invention is to provide a target for photogrammetry, by which positional data of a camera is calculated based on a photographed picture by photographing an object therewith.

In accordance with an aspect of the present invention, there is provided a target for photogrammetric analytic measurement, which is photographed with an object by a camera in the photogrammetric analytic measurement, the target having standard points that are clearly discerned in a photographed picture, and a calculation of photographing positions of the camera being performed by determining a positional relationship of each of the standard points in the photographed pictures, the target comprising: a first standard point member defining a first standard point included in the standard points; a second standard point member defining a second standard point included in the standard points; a third standard point member defining a third standard point included in the standard points; and assistant point members respectively defining assistant points that are clearly discerned in the photographed picture.

Preferably, distances between each of the first standard point and the second standard point and the third standard point, are predetermined. A first straight line connecting the first standard point and the second standard point, and a second straight line connecting the second standard point and the third standard point are inclined at a predetermined angle. At least one of the assistant points are positioned on the first straight line and the second straight line.

Preferably, a distance between the first standard point and the second standard point equals a distance between the second standard point and the third standard point. The predetermined angle is right angle.

Preferably, the first standard point, the second standard point and at least one of the assistant points being positioned on the first straight line, are positioned at equal spaces on the first straight line, and the second standard point, the third point and at least one of the assistant points being positioned on the second straight line, are positioned at equal spaces on the second straight line.

Preferably, a number of the assistant points on the first straight line is different from a number of the assistant points on the second straight line.

Optionally, the number of the assistant points on the first straight line is two, and the number of the assistant points on the second straight line is one.

In accordance with another aspect of the present invention, there is provided a target for photogrammetric analytic measurement, which is photographed with an object by a camera in the photogrammetric analytic measurement, the target comprising: a first bar and a second bar that are connected to each other; at least three standard point members, lying on one plane, that are fixed on the first bar and the second bar; and non-reflecting embers that are respectively attachable to and removable from said at least three standard points.

Preferably, the at least three standard point members respectively comprise a circular portion, a diameter of which substantially equals the width of the first bar and the second bar.

Preferably, each of the non-reflecting members is a circular plate, and a circular opening, a diameter of which substantially equals the diameter of the circular portion of the at least three standard point members, is formed at a center portion of the circular plate.

Preferably, a reflecting sheet, by which a reflecting amount of incident light thereon is increased, is attached on a surface of the circular portion, and a non-reflecting sheet, by which a reflecting amount of incident light thereon is reduced, is attached on a surface of the non-reflecting members. The surface of the circular portion and the surface of the non-reflecting members are on a side opposite to a side of the first bar and the second bar, when the non-reflecting members are respectively attached to the standard point members.

Preferably, the reflecting sheet and the non-reflecting sheet are placed on the one plane.

Preferably, one of each of the at least three standard point members and each of the non-reflecting members comprises a ferromagnet, and another of each of the at least three standard point members and each of the non-reflecting ambers comprises a magnetic material.

Preferably, each of the at least three standard point members comprises a magnet that is ring shaped, a center point of which is coincident with a center point of the circular portion, and each of the non-reflecting members comprises a metal material that is attached to the magnet by magnetic force. The metal material is placed around the circular opening, on a surface opposite to the surface to which the non-reflecting sheet is attached.

Preferably, a reference plane is determined by the standard point members, and the target further comprises: a first tilt sensor that senses a first tilt angle to a horizontal plane around a first axis on the reference plane; a second tilt sensor that senses a second tilt angle to the horizontal plane around a second axis which is perpendicular to the first axis, on the reference plane; an azimuth sensor that senses an azimuth; and a transmitting device that transmits data of the first tilt angle, the second tilt angle and the azimuth by wireless.

Preferably, the non-reflecting members are made of a material through which an electric wave can transmit.

Preferably, the azimuth sensor is placed intermediately between two of the at least three standard point members, which are adjoining.

Preferably, the first bar and the second bar are connected in such a manner that one and of the first bar and one end of the second bar are rotatably connected; when the target is in an operational position, the first bar and the second bar are fixed in such a manner that the first bar and the second bar are perpendicular to each other; and when the target is not in the operational position, the first bar and the second bar are fixed in such a manner that the first bar and the second bar are substantially parallel to each other.

Preferably, the target further comprises: a fixing member that fixes a relational position between the first bar and the second bar in such a manner that the first bar and the second bar are perpendicular to each other, when the target is in the operational position; a hinge that rotatably connects the fixing member to the first bar; a lock hinge by which the fixing member is attachable to and removable from the second bar.

Preferably, the target further comprises: a first fixing mechanism that fixes the second bar to the first bar such that the second bar is parallel to the first bar when the target is not in the operational position; a second fixing mechanism that fixes the fixing member to the first bar such that the fixing member is placed between the first bar and the second bar when the target is not in the operational position.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
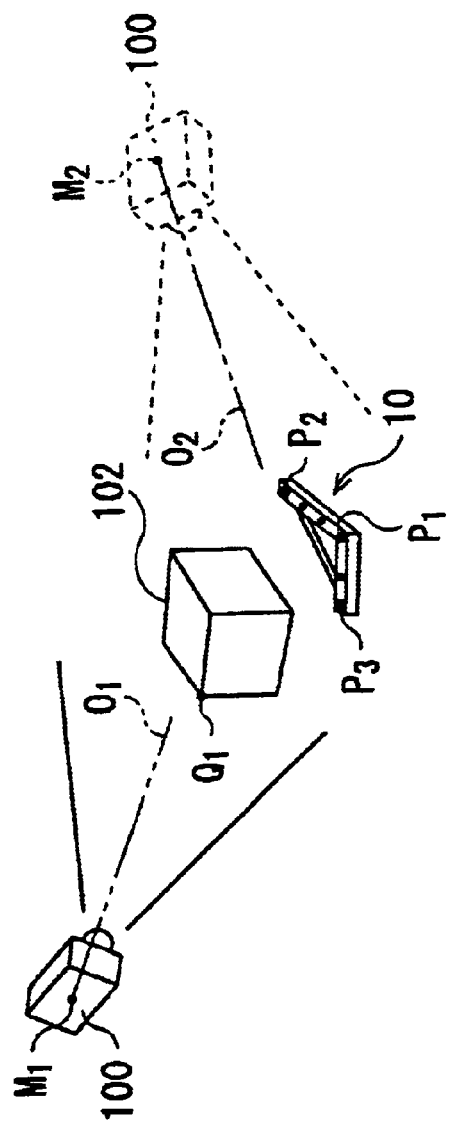
FIG. 1 is a conceptual perspective view showing the measurement system according to the present invention.

FIG. 1 conceptually shows a photogrammetric measurement system, using a target to which an embodiment, according to the present invention, is applied. In this drawing, a cubic object 102 is situated at a spot to be photogrammetrically measured, and a target 10 is placed beside the cubic object 102. The target 10 and the cubic object 102 are photographed from two different directions by the camera, indicated by reference 100. Namely, as shown in FIG. 1, the target 10 and the cubic object 102 are photographed by the camera 100 placed at a first photographing position $M_1$, shown by a solid line, and are then photographed by the camera 100 placed at a second photographing position $M_2$, shown by a broken line. At the first photographing position $M_1$, an optical axis of the camera 100 in indicated by reference $O_1$, and, at the second photographing position $M_2$, the optical axis of the camera 100 is indicated by reference $O_2$.

Note, each of the first and second photographing positions $M_1$ and $M_2$ may be defined as a back principal point of the photographing optical system 12 of the camera 100.

The target 10 comprises two bars, having an L-shaped figure. Namely, the two bars are connected in such a manner that one and of one bar and one end of the other bar are connected. Three standard point members $P_1$, $P_2$, $P_3$ and three assistant point members are mounted on the target 10. The standard point members $P_1$, $P_2$ and $P_3$ respectively define standard points and the assistant point members respectively define assistant points, in photographed pictures.

The standard point members $P_1$, $P_2$ and $P_3$ are disposed on three apexes of a triangular shape defined by the target 10. A plane defined by the standard point members $P_1$, $P_2$ and $P_3$ is a reference plane. A distance between the standard point member $P_1$ and the standard point ember $P_2$ have a predetermined length of L, which is utilized as a standard measurement length. Further, a distance between the standard point members $P_1$ and $P_3$ equals the distance between the standard point members $P_1$ and $P_2$, and an angle, defined by the side between the standard point members $P_1$, $P_2$ and the side between the standard point members $P_1$, $P_3$, is 90 degrees.

Figure 2:
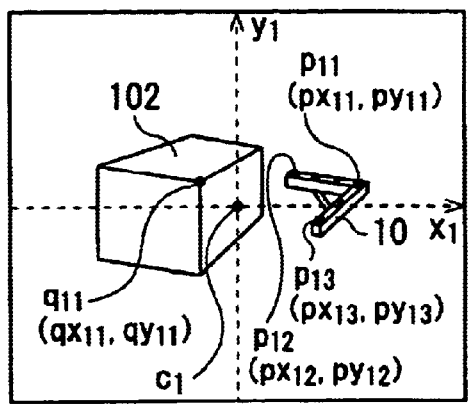
FIG. 2 is a conceptual view showing a picture photographed at a first photographing position in the measurement system of FIG. 1.

FIG. 2 shows a first picture photographed by the camera 100 at the first photographing position $M_1$. As is apparent from this drawing, an $x_1$–$y_1$ rectangular coordinate system is defined on the first picture, and an origin $c_1$ of the $x_1$–$y_1$ coordinate system is at the photographed center of the first picture. In this coordinate system, the standard point members $P_1$, $P_2$ and $P_3$ are represented by coordinates $p_{11}(px_{11}, py_{11})$ $p_{12}(px_{12}, py_{12})$ and $p_{13}(px_{13}, py_{13})$, respectively.

Figure 3:
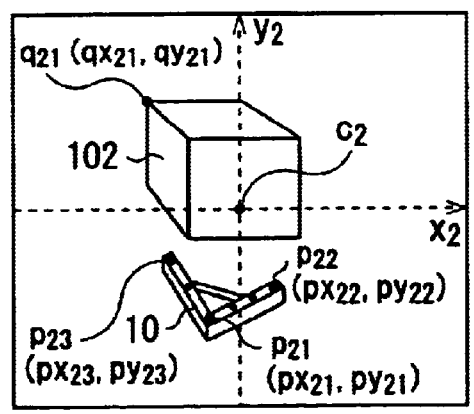
FIG. 3 is a conceptual view showing another picture photographed at a second photographing position in the measurement system of FIG. 1.

FIG. 3 shows a second picture photographed by the camera 100 at the second photographing position $M_2$. As is apparent from this drawing, an $x_2$–$y_2$ rectangular coordinate system is defined on the second picture, and an origin $c_2$ of the $x_2$–$y_2$ coordinate system is at the photographed center of the second picture. In this coordinate system, the standard point members $P_1$, $P_2$ and $P_3$ are represented by coordinates $p_{21}(px_{21}, py_{21})$ $p_{22}(px_{22}, py_{22})$ and $p_{23}(px_{23}, py_{23})$, respectively.

As shown in FIGS. 2 and 3, each coordinate of the standard point members $P_1$, $P_2$ and $P_3$ is represented by $p_{ij}(px_{ij}, py_{ij})$. A variable "i" indicates a number of the picture. Namely, when "i" is set to "1", it indicates the first picture FIG. 2, and when "i" is set to "2", it indicates the second picture FIG. 3. Further, a variable "j" indicates a number of the standard point ember. In this embodiment, the variable "j" can vary between 1, 2 and 3.

Figure 4:
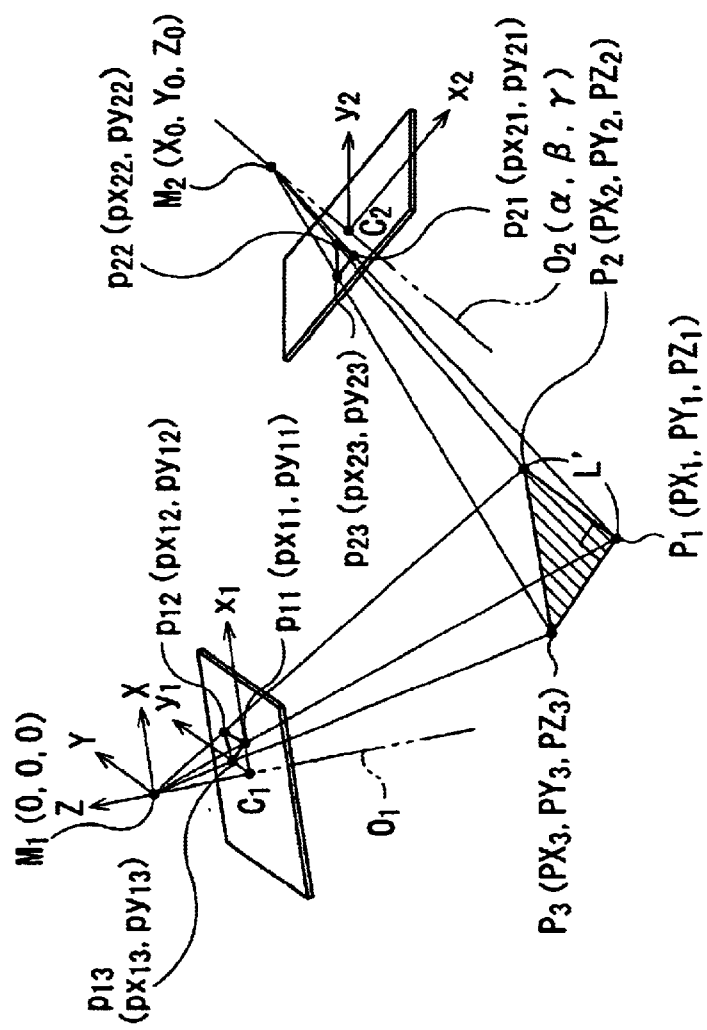
FIG. 4 is a conceptual view showing a relative-positional relationship between the standard scale and the first and second pictures from FIGS. 2 and 3, respectively.

FIG. 4 shows a relative-positional three-dimensional relationship between the target 10, the camera 100, the first and second pictures in this case, the target 10 is relatively reproduced on the basis of the first and second pictures placed at the first and second photographing positions $M_1$ and $M_2$, but a size of the target 10 is also relative. Thus, the side defined by the standard point members $P_1$ and $P_2$ is indicated by L'. Further, the reference plane defined by the standard point member $P_1$, $P_2$ and $P_3$ is indicated as a hatched area in the drawing.

In order to calculate the three-dimensional coordinates of the cubic object 102, it is necessary to define an X-Y-Z three-dimensional coordinate system, as shown in FIG. 4, and the standard point members $P_1$, $P_2$ and $P_3$ of the target 10, recorded on each of the first and second pictures, must be positionally determined with respect to this three-dimensional coordinate system. The X-Y-Z three-dimensional coordinate system is a right-handed coordinate system.

As shown in FIG. 4, an origin of the X-Y-Z three-dimensional coordinate system is at the first photographing position $M_1$. Namely, the first photographing position $M_1$ is represented by the origin coordinates (0, 0, 0) of the X-Y-Z three-dimensional coordinate system. Also, a Z-axis of the X-Y-Z three-dimensional coordinate system coincides with the optical axis $O_1$ of the camera 100, placed at the first photographing position $M_1$, represented by angular coordinates (0, 0, 0).

The second photographing position $M_2$ is represented by coordinates ($X_0$, $Y_0$, $Z_0$). The coordinates ($X_0$, $Y_0$, $Z_0$) indicates an amount of change from the first photographing position $M_1$ to the second photographing position $M_2$. The optical axis $O_2$ of the camera 100, placed at the second photographing position $M_2$, is represented by angular coordinates ($\alpha$, $\beta$, $\gamma$). Namely, the optical axis $O_2$ of the camera 100 defines angles of $\alpha$, $\beta$ and $\gamma$ with the X-axis, Y-axis and Z-axis of the X-Y-Z three-dimensional coordinate system, respectively.

The standard point members $P_1$, $P_2$ and $P_3$ of the target 10 are represented by three-dimensional coordinates $P_j(PX_j, PY_j, PZ_j)$ (j=1, 2, 3). As shown in FIG. 4, each of the standard point members [$P_1$ ($PX_1$, $PY_1$, $PZ_1$), $P_2(PX_2, PY_2, PZ_2)$ and $P_3(PX_3, PY_3, PZ_3)$], the image point [$P_{11}(px_{11}, py_{11})$ $p_{12}(px_{12}, px_{12})$, $p_{13}(px_{13}, py_{13})$] of the corresponding reference point recorded on the first picture, and the back principal point ($M_1$) of the camera 100, are aligned with each other on a straight axis. Similarly, each of the reference points [$P_1(PX_1, PY_1, PZ_1)$, $P_2(PX_2, PY_2, PZ_2)$ and $P_3(PX_3, PY_3, PZ_3)$], the image point [$p_{21}(px_{21}, py_{21})$, $p_{22}(px_{22}, py_{22})$, $p_{23}(px_{23}, py_{23})$] of the corresponding reference point recorded on the second picture, and the back principal point ($M_2$) of the camera 100, are aligned with each other on a straight axis.

Accordingly, the three-dimensional coordinates $P_j(PX_3, PY_j, PZ_j)$ can be determined by the following collinear equations:

$$PXj = (PZj - Zo)\frac{a11pxij + a21pyij - a31C}{a13pxij + a23pyij - a33C} + Xo$$

$$PYj = (PZj - ZO)\frac{a12pxij + a22pyij - a32C}{a13pxij + a23pyij - a33C} + Yo$$

(i = 1, 2; j = 1, 2, 3)

Herein: a11=cos $\beta$·sin $\gamma$
a12=-cos $\beta$·sin $\gamma$
a13=sin $\beta$
a21=cos $\alpha$·sin $\gamma$+sin $\alpha$·sin $\beta$cos $\gamma$
a22=cos $\alpha$·cos $\beta$–sin $\alpha$·sin $\beta$sin $\gamma$
a23=–sin $\alpha$·cos $\beta$
a31=sin $\alpha$·sin $\gamma$+cos $\alpha$#sin $\beta$·cos $\gamma$
a32=sin $\alpha$·cos $\gamma$+cos $\alpha$#sin $\beta$·sin $\gamma$
a33=cos $\alpha$·cos $\beta$ Note that, in these equations, C indicates a principal focal length of the camera 100, which is defined as a distance between the back principal point ($M_1$) and the photographing center ($c_1$) of the first picture, and a distance between the back principal point ($M_2$) and the photographing center ($c_2$) of the second picture.

Figure 5:
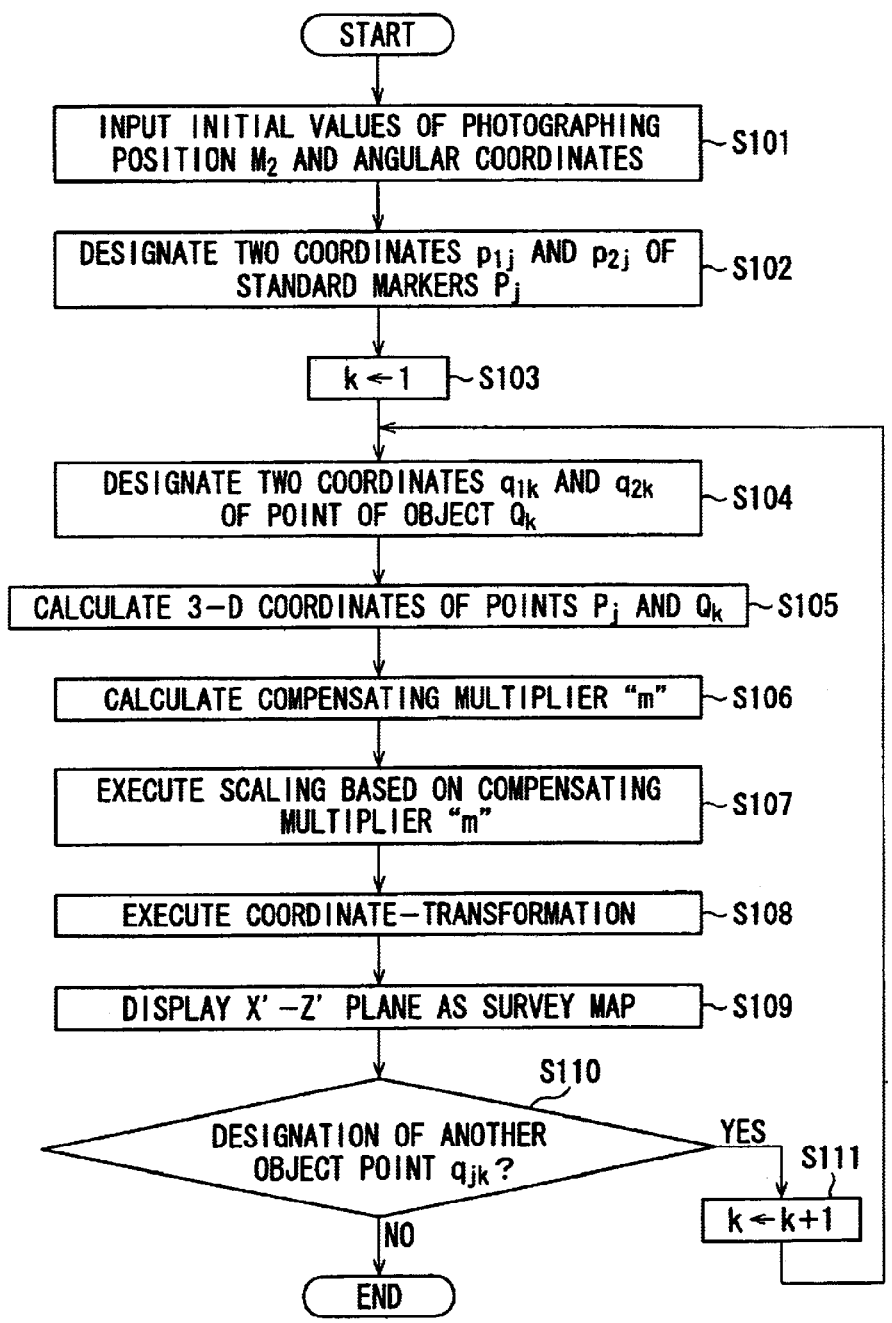
FIG. 5 is a flowchart showing a procedure of a routine for making a photogrammetric map based on the pictures of FIGS. 2 and 3.

FIG. 5 shows a flowchart of a photogrammetric measurement routine, executed in a computer, in which a survey map is developed based upon the first and second pictures, shown in FIGS. 2 and 3. In executing the routine, a set of frame numbers, corresponding to the first and second pictures, is selected by an operator. On a screen of a monitor connected to the computer, the first and second pictures are displayed.

In step S101, as three-dimensional coordinate data ($X_0$, $Y_0$, $Z_0$) of the second photographing position $M_2$, suitable initial values (except for zero) are inputted to the computer via an input device, for example, keyboard. Similarly, as the angular coordinates ($\alpha$, $\beta$, $\gamma$), suitable initial values (except for zero) are inputted to the computer.

In step S102, the respective reference points $p_{ij}(px_{ij}, py_{ij})$ are successively designated, on the first and second pictures displayed on the monitor, with a cursor manipulated by a mouse. Namely, the two sets of coordinates $p_{11}(px_{11}, py_{11})$ and $p_{21}(px_{21}, py_{21})$ the two sets of coordinates $p_{12}(px_{12}, py_{12})$ and $p_{22}(px_{22}, py_{22})$, and the two sets of coordinates $p_{13}(px_{13}, py_{13})$ and $p_{23}(px_{23}, py_{23})$ are also temporarily stored in a memory of the computer.

After the designation of the points $p_{ij}(px_{ij}, py_{ij})$ at step S102, the control proceeds to step S103, in which a counter k is set to "1". Then, in stop S104, a suitable point $Q_{1(k=1)}$ of the cubic object 102 is selected (FIG. 1), and image points $q_{ik}$ (FIGS. 2 and 3) of the selected point $Q_1$ displayed on the first and second pictures of the monitor, are designated with the cursor, manipulated by the mouse. Namely, the two sets of coordinates $q_{11}(qx_{11}, qy_{11})$ and $q_{21}(qx_{21}, qy_{21})$ of the image point $Q_1$ are temporarily stored in the memory of the computer.

The positional relationship between the suitable point $Q_{1(k=1)}$ the image points $q_{ik}$, and the first and the second photographing positions $M_1$, $M_2$ is similar to the positional relationship between the standard point member $P_j$, the reference points $p_{ij}$, on the first and the second pictures and the first and the second photographing positions $M_1$, $M_2$. Namely, the suitable point $Q_{1(k=1)}$, the image points $q_{ik}$, and the first and the second photographing positions $M_1$, $M_2$ are positioned on a straight line. Accordingly, the three-dimensional coordinates $Q_j(QX_j, QY_j, QZ_j)$ can be determined by the aforementioned collinear equations.

In step S105, the above-mentioned collinear equations are solved on the basis of the coordinate data stored in the memory, so that the three-dimensional coordinates $P_j(PX_j, PY_j, PZ_j)$ of the standard point members $P_1$, $P_2$ and $P_3$, the three-dimensional coordinates $Q_1(QX_1, QY_1, QZ_1)$ of the object point $Q_1$, the three-dimensional coordinate data ($X_0$, $Y_0$, $Z_0$) and the angular coordinates ($\alpha$, $\beta$, $\gamma$) are approximately estimated. Note that, in accordance with repeating the approximation calculation based on the collinear equations, the coordinate data ($X_0$, $Y_0$, $Z_0$) and the angular coordinates ($\alpha$, $\beta$, $\gamma$) are sufficiently approximated.

Namely, the three-dimensional coordinates $P_j(PX_j, PY_j, PZ_j)$ of the standard point members $P_j$ are calculated based on the two-dimensional coordinates $p_{1j}(px_{1j}, py_{1j})$ on the first picture and the two-dimensional coordinates $p_{2j}(px_{2j}, py_{2j})$ on the second picture. Also, the three-dimensional coordinates $Q_1(QX_1, QY_1, QZ_1)$ of the object point $Q_1$ are calculated based on the two-dimensional coordinates $q_{1k}$ ($qx_{1k}, qy_{1k}$) of the object point $Q_1$ on the first picture and the two-dimensional coordinates $q_{2k}(qx_{2k}, qy_{2k})$ of the object point $Q_1$ on the second picture. Consequently, the three-dimensional coordinate data ($X_0$, $Y_0$, $Z_0$) and the angular coordinates ($\alpha$, $\beta$, $\gamma$) are approximately estimated.

In step S106, a compensating multiplierm is calculated. The compensating multiplier is utilized for compensating a relative length on the three-dimensional coordinate to obtain a practical length thereof. The compensating multiplier m is calculated as follows:

$m=L/L'$

Note, as shown FIG. 1, L is the practical length between the standard point members $P_1$, $P_2$ and $P_3$, and L' is the relative length obtained from the determined three-dimensional coordinates $P_j(PX_j, PY_j, PZ_j)$. Namely, the relationship between the practical length L and relative length L' can be indicated by the following equation:

$L=L'\times m$ (m:compensating multiplier)

In step S107, scaling is executed, using the compensating multiplier m, between the determined three-dimensional coordinates $P_j(PX_j, PY_j, PZ_j)$ and $Q_1(QX_1, QY_1, QZ_1)$, so as to obtain an accurate spatial relationship therebetween.

Figure 6:
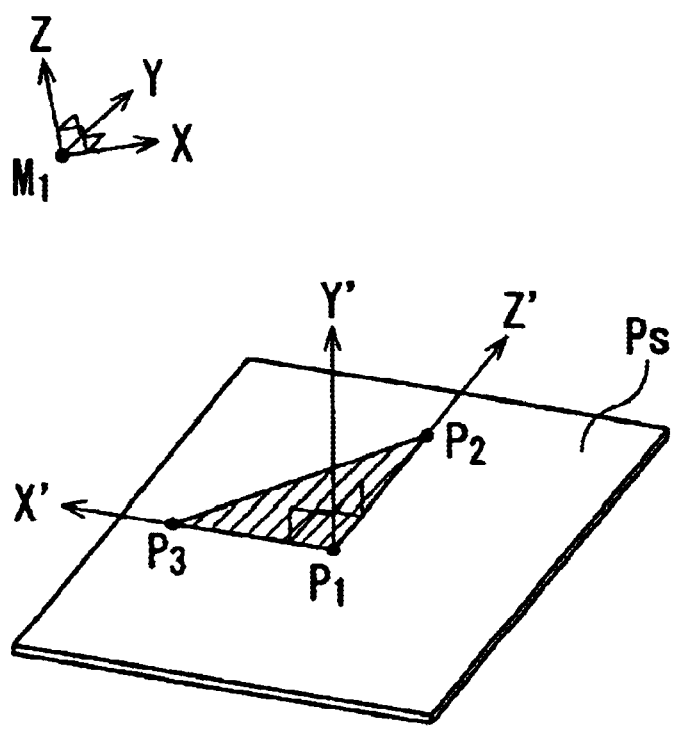
FIG. 6 is a conceptual view showing a three-dimensional coordinate based on a plane on which the standard scale lie.

Then, in step S105, the X-Y-Z three-dimensional coordinate system is transformed into an X'-Y'-Z' three-dimensional coordinate system defined as shown in FIG. 6. As apparent from FIG. 6, an origin of the X'-Y'-Z' three-dimensional coordinate system is at the standard point member $p_1$, and the X'-axis thereof is defined by a straight line connecting the standard point members $p_1$ and $p_2$. Also, the X'- and Z'-axes of the coordinate system define a plane ps, which 10 includes the hatched triangular plane area or reference area defined by the reference points $p_1$, $p_2$ and $p_3$. In the example of FIG. 6, although the origin of the X'-Y'-Z' three-dimensional coordinate system coincides with the reference point $p_1$, the origin may be at any location included in the plane ps.

In step S109, the X'-Z' plane Ps, on which the reference points $P_1$, $P_2$ and $P_3$ and the object points $Q_1$ and $Q_2$ are recorded, is displayed as a survey map on the monitor. Note that, the X'-Y' plane or the Y'-Z' plane may be displayed as a survey map. Further, a stereoscopic perspective view, based on the X'-Y'-Z' three-dimensional coordinate system, may be displayed as a survey map.

Then, in stop S110, it is determined whether or not another set of points $q_{1k}$ and $q_{2k}$ should be designated with respect to the cubic object 102. When another set of points $q_{1k}$ and $q_{2k}$ should be further designated, the process proceeds to step S111, in which the counter k is incremented by 1. Then, the process returns to step S104. Instep S104, a suitable point $Q_{2(k=2)}$ of the cubic object 102 is selected, and the two sets of coordinates $q_{12}(qx_{12}, qy_{12})$ and $q_{22}(qx_{22}, qy_{22})$ of the image point $Q_2$ are temporarily stored in the memory of the computer.

In step S105, the above-mentioned collinear equations are solved on the basis of the coordinate data, i.e. the two-dimensional coordinates $p_{1j}(px_{1j}, py_{1j})$ $p_{2j}(px_{2j}, py_{2j})$, and the two-dimensional coordinates $q_{1k}(qx_{1k}, qy_{1k})$ $q_{2k}(qx_{2k}, qy_{2k})$, stored in the memory. Accordingly, the three-dimensional coordinates $P_j(PX_j, PY_j, PZ_j)$ of the standard point members $P_1$, $P_2$ and $P_3$, the three-dimensional coordinates $Q_k(QX_k, QY_k, QZ_k)$ of the object points $Q_1$ and $Q_2$, the three-dimensional coordinate data $(X_0, Y_0, Z_0)$ and the angular coordinates $(\alpha, \beta, \gamma)$ are approximately estimated. Note that, in accordance with repeating the approximation calculation based on the collinear equations, the coordinate data $(X_0, Y_0, Z_0)$ and the angular coordinates $(\alpha, \beta, \gamma)$ are sufficiently approximated.

Namely, as a number of suitable point of the cubic object 102 increases, the three-dimensional coordinate data $(X_0, Y_0, Z_0)$ and the angular coordinates $(\alpha, \beta, \gamma)$ are more accurately estimated. Note that, at least five sets of two-dimensional coordinate data, including the two-dimensional coordinate data of the standard point members $P_1$, $P_2$, $P_3$, are required in the above-mentioned approximation calculation.

Figure 7:
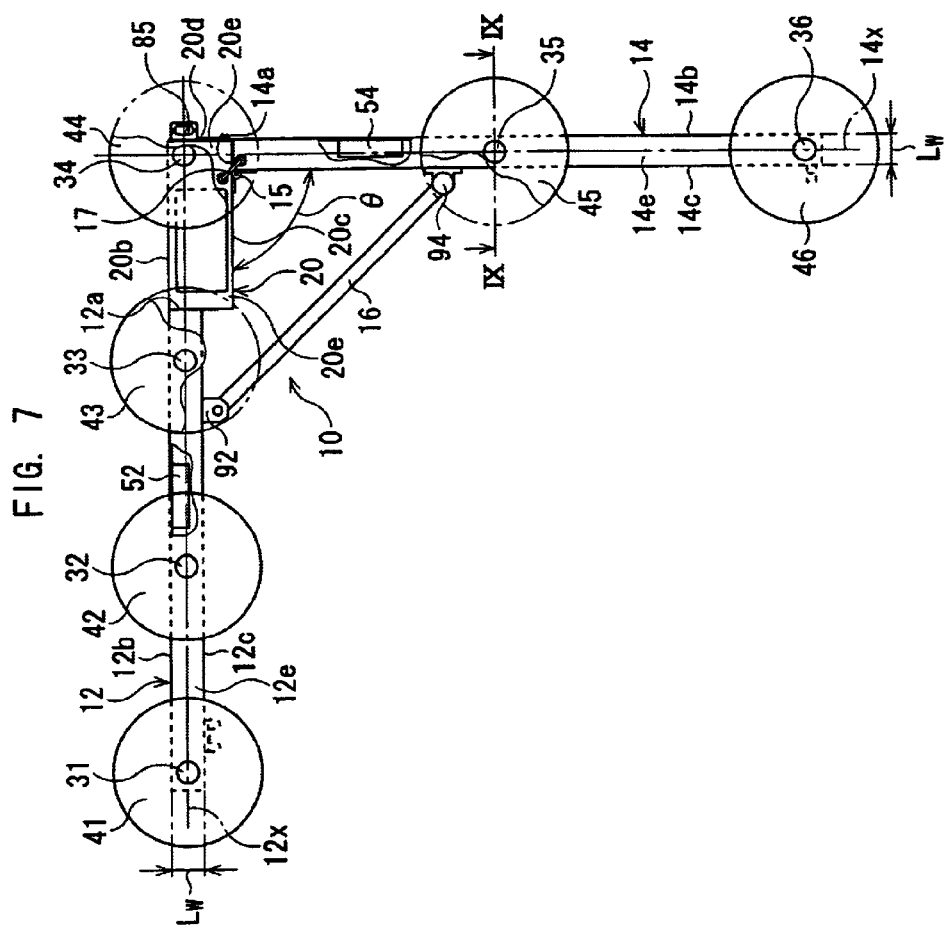
FIG. 7 is a plane view of a target in an operational state, to which an embodiment, according to the present invention, is applied.
Figure 8:
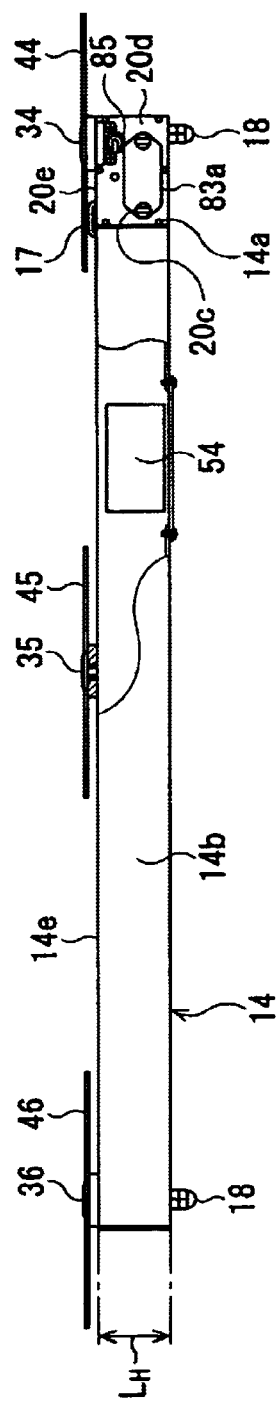
FIG. 8 is a side view of the target of FIG. 7.

FIG. 7 is a plan view of the target 10, with portions broken away for clarity, and FIG. 8 is a side view of the target 10.

The target 10 has the L-shaped figure, comprising a first bar 12 and a second bar 14. The first and second bars 12, 14 are made of metal material. The first and second bars 12, 14 respectively have a shape of quadratic prism, which is hollow. A non-reflecting sheet, which does not reflect light, is attached to the whole outer side surface of each of the first and second bars 12, 14. The width of each of the first and second bars 12, 14 has a length $L_W$, and the thickness of each of the first and second bars 12, 14 has a length $L_H$.

An adhesive is applied on a surface of the non-reflecting sheet, which contacts with the surface of the bars 12, 14. The other surface of the sheet is colored black, and rough. Incident light on the black and rough surface is absorbed and diffused, so that luminance amount of reflecting light is extremely reduced. Note that, for example, a black flattering agent can be applied on the outer surface of each of the first and second bars 12, 14, instead of utilizing the non-reflecting sheet.

A controlling unit box 20, which is shaped parallele piped, is unitarily fixed at one end of the first bar 12. The controlling unit box 20 is made of metal material. The non-reflecting sheet is attached on the whole outer surface of the controlling unit box 20. The thickness of the controlling unit box 20 equals the thickness $L_H$ of the first bar 12. The width of the controlling unit box 20 is twice the width $L_w$ of the first bar 12. The controlling unit box 20 is positioned in such a manner that a side surface 20b and a side surface 12b of-the bar 12 lie on a same plane. A side surface 20c of the controlling unit box 20 is parallel to a side surface 12c of the bar 12, being offset in a direction opposite to the side surface 20b.

One end 14a of the second bar 14 is rotatably mounted on the side surface 20c of the controlling unit box 20, by a hinge 15. A side surface 14b of the second bar 14 and an end surface 20d of the controlling unit box 20, opposite to the end surface at which the first bar 12 is fixed, lie on a same plane, when the target 10 is utilized for the aforementioned photogrammetry.

As shown in FIG. 7, the side surface 14c of the second bar 14 and the side surface 20c of the controlling unit box 20 define an angle θ. Namely, the angle θ is an right angle made by an axis 12x (represented as a broken line) of the first bar 12 and an axis 14x (represented as a broken line) of the second bar 14. A stay 16, which is a fixing member, is connected to the first and second bars 12, 14, at the side of the angle e. The rotational movement of the second bar 14 is prevented by the stay 16, so that the positional relationship between the first and the second bars 12, 14, showing FIG. 8, is maintained. The width and the thickness of the stay 16 is respectively smaller than the length $L_W$ and $L_H$, of the first and second bars 12, 14. Further, a length along the longitudinal direction of stay 16 is shorter than the length of the longitudinal direction of the first and second bars 12, 14.

The stay 16 is rotatably connected to the first bar 12 by a stay hinge 92, being attachable to and removable from the second bar 14 by a lock hinge 94. When the target 10 is utilized in an operational position shown in FIG. 7, the stay 16 is positioned so as to make a predetermined angle with each of the first and second bars 12, 14, so that the first and second bars 12, 14 makes a right angle.

On the top surface of the target 10, namely, on the top surfaces of the bars 12, 14 and the controlling unit box 20, three standard point members 31, 34 and 36, and three assistant point members 32, 33 and 35 are mounted. The standard point member 31 (first standard point member) is a circular plate, diameter of which has a length smaller than the width $L_W$ of the first and second bars 12, 14. The standard point members 34 (second standard point member), 36 (third standard point member) and the assistant point members 32, 33 and 35 are identical to the standard point member 31. The standard point members 31, 34 and 36 respectively define the standard points $P_1$, $P_2$ and $P_3$. The assistant point members 32, 33 and 35 respectively define the assistant points.

The standard point amber 31 and the assistant point members 32, 33 are mounted on the top surface 12e of the first bar 12. The standard point member 34 is mounted on the top surface 20e of the controlling unit box 20. The assistant point member 35 and the standard point member 36 are mounted on the top surface 14e of the second bar 14. The assistant point members 32 and 33 are positioned in such a manner that centers of the assistant point members 32 and 33 lie on a straight line (first straight line) parallel to the axis 12x, which connects a center of the standard point member 31 and a center of the standard point member 34. Also, the assistant point member 35 is positioned in such a manner that a center of the assistant point seer 35 lies on a straight line (second straight line) parallel to the axis 14x, which connects a center of the standard point member 34 and a center of the standard point member 36.

As described above, there are two assistant point members (32, 33) on the straight line connecting the standard point members 31 and 34, and there is one assistant point member (35) on the straight line connecting the standard point members 34 and 36. Namely, a number of assistant point member on each of the straight lines is different from each other. Further, a distance between the center of the standard point member 31 and the center of the assistant point member 32, a distance between the center of the assistant point member 32 and the center of the assistant point member 33, and a distance between the center of the assistant point member 33 and the center of the standard point member 34, are identical to each other. A distance between the center of the standard point member 34 and the center of the assistant point member 35, and a distance between the center of the assistant point member 35 and the center of the standard point member 36, are identical to each other. Furthermore, a distance between the center of the standard point member 31 and the standard point member 34, and a distance between the center of the standard point member 34 and the center of the standard point member 36, are identical to each other.

The aforementioned reference plane for the photogrammetric analytical measurement is defined by the standard point members 31, 34 and 36, and the assistant point members 32, 33 and 35. The standard measurement length is defined by a side length of an isosceles triangle apexes of which correspond to the standard point members 31, 34 and 36. Namely, a length of the distance between the standard point members 31 and 34, corresponding to the length L of FIG. 1, a length of the distance between the standard point members 34 and 36, and a length of the distance between the standard point members 36 and 31 can be used the standard measurement length, as they are predetermined.

Note that, the angle θ is not restricted to 90°, and it is unnecessary to make the distance between 31, 34 and the distance between 34, 36 equal to each other. Namely, it is required that each value of the angle θ, the length of the distance between the standard point members 31, 34 and the length of the distance between the standard point members 34, 36 are predetermined. Considering facility of calculation in the photogrammetric analytical measurement system, it is preferable that the value of the angle θ is predetermined to be 90° and the distance between the standard point members 31, 34 and the distance between the standard point members 34, 36 are equal to each other.

As is apparent from FIG. 7, on each of the equilaterals of the isosceles triangle, a number of the assistant point members is different. Accordingly, as a positional relationship between the target 10 and other objects in a picture can be easily judged, determination of the photographing position of each picture for the photogrammetric analytical measurement system is facilitated.

Further, as the positional relationship between the first bar 12 and the second bar 14 is fixedly maintained by the stay 16, the angle θ is determined precisely. Accordingly, the photogrammetric analytical measurement becomes more accurate.

The mounting of the hinge 15 produces an interval between the side surface 20c of the controlling unit box 20 and the end surface 14a of the second bar 14. An elastic member 19 (see FIG. 11) is disposed at the interval. Accordingly, shaking of the second bar 14 is prevented. The elastic member 19 is made of, for example, rubber and sponge, being attached on the end surface 14a or the side surface 20c. Note that, a spring can be utilized instead of the elastic member 19.

A reflecting sheet is attached on the standard point members 31, 34, 36 and the assistant point members 32, 33, 35. As the surface of the reflecting sheet is smooth, and colored white, a reflecting amount of incident light on the sheet is increased. The standard point members 31, 34 and 36 are respectively surrounded by non-reflecting members 41, 44 and 46. Similarly, the assistant point members 32, 33, 35 are respectively surrounded by non-reflecting members 42, 43 and 45. On the non-reflecting members 41, 42, 43, 44, 45 and 46, the non-reflecting sheet is attached, respectively. Accordingly, discrimination of the standard point members 31, 34, 36 and the assistant point members 32, 33, 35 in the pictures is facilitated, so that the photogrammetric analytic measurement can be performed accurately.

The target 10 comprises a first tilt sensor 52 and a second tilt sensor 54. Tilt angles of the target 10 around the axes 12x and 14x are sensed by the first and second tilt sensors 52, 54. The first tilt sensor 52 is mounted in the first bar 12, being placed between the assistant point members 32 and the standard point members 34. The tilt angle to a horizontal plane around the axis 12x is sensed by the first tilt sensor 52. The second tilt sensor 54 is mounted in the second bar 14, being placed between the standard point member 34 and the assistant point member 35. The tilt angle of the horizontal plane around the axis 14x is sensed by the second tilt sensor 54.

The first and second tilt sensors 52, 54 are connected to the controlling box 20 by a cable 17. Data of the tilt angles is transmitted to the controlling box 20 by the cable 17.

The angle of the standard plans to the horizontal plane is obtained by sensing the tilt angles around the axes 12z and 14x which are perpendicular to each other. Accordingly, in the aforementioned photogrammetric analytic measurement, the two-dimensional coordinate system on the X'-Z' plane Ps is transformed into a two-dimensional coordinate system on the horizontal plane, so that the horizontal plane can be displayed on the monitor as the survey map. Note that, as the above transformation is well-known art, the explanation of the transformation is not described in detail.

The target 10 comprises three legs 18. The legs 18 are mounted on the bottom surface opposite to the top surface on which the standard point members 31, 34, 36 and the assistant point members 32, 33, 35 are mounted. Each of the logs 18 respectively correspond to the standard point members 31, 33 and 36. In a spot for photogrammetric analytic measurement, the target 10 is supported above a road with the interval corresponding to the height of the leg 18 therebetween. Accordingly, the target 10 is positioned so as to be parallel to general inclination of the road, without being effected by roughness of the surface of the road.

Figure 9:
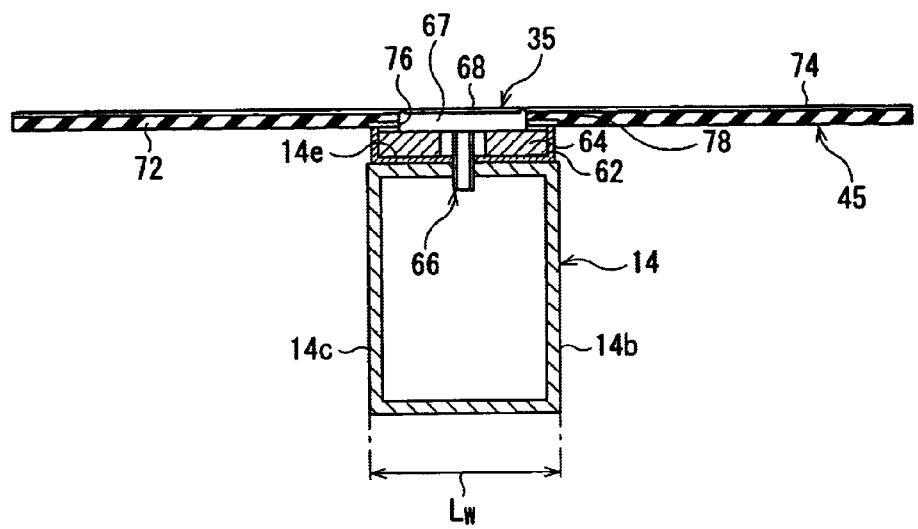
FIG. 9 is a sectional view of the target of FIG. 7.
Figure 10:
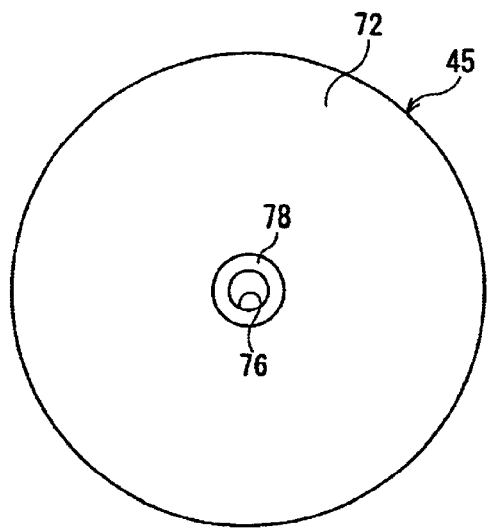
FIG. 10 is a plane view of a non-reflecting member viewed from a bottom side of a second bar.

With reference to FIGS. 9 and 10, the constructions of the assistant point meter 35 and the non-reflecting member 45 are described below. FIG. 9 is a sectional view of the target 10, taken in the direction of the arrows substantially along the line IX—IX of FIG. 7. FIG. 10 is a plane view of the non-reflecting member 45, shown from the side of the second bar 14.

A magnet holder 62 is mounted on the top surface 14e of the second bar 14. A magnet 64, which is ring-shaped, is held In the magnet holder 62. The outer diameter of the magnet holder 62 approximately equals the width $L_W$ of the second bar 14. The magnet 64 and the magnet holder 62 are integratedly fixed to the second bar 14 by a screw 66. A reflecting sheet 68 is attached to a head 67 of the screw 66. The assistant point member 35 comprises the magnet holder 62, the magnet 64, the screw 66 and the reflecting sheet 68.

The non-reflecting member 45 comprises a circular plate 72, made of a material through which an electric wave transmits, for example, resin or rubber material. If the circular plate 72 is made of rubber material, breakage of the circular plate 72 is avoided when the circular plate 72 is accidentally dropped. A non-reflecting sheet 74 is attached to one surface of the circular plate 72. The diameter of the non-reflecting member 45 is approximately seven times of the diameter of the head 67 of the screw 66. The thickness of the non-reflecting member 45 is slightly smaller than the thickness of the head 67.

An engagement hole 76 is formed at the center of the non-reflecting member 45. The diameter of the engagement hole 76 approximately equals the diameter of the head 67. An iron ring 78 abuts around the engagement hole 76, at the surface opposite to the surface on which the non-reflecting sheet 74 is attached. The inner diameter of the iron ring 78 approximately equals the diameter of the engagement hole 76, and the outer diameter of the iron ring 78 approximately equals the outer diameter of the magnet holder 62.

The non-reflecting member 45 is attachable to and removable from the assistant point member 35. When the target 10 is utilized for the photogrammetric analytic measurement, the non-reflecting ember 45 is mounted on the assistant point member 35 in such a manner that the head 67 of the screw 66 is engaged with the engagement hole 76. In accordance with the engagement of the head 67 and the engagement hole 76, the iron ring 79 is fixedly attached to the magnet holder 62 by magnetic force of the magnet 64, so that the iron ring 78 is securely engaged with the head 67. As is apparent from FIG. 9, when the non-reflecting ember 45 is mounted on the assistant point ember 35, the reflecting sheet 68 and the non-reflecting sheet 74 lie on a same plane. On the other hand, when the target 10 is not utilized, the non-reflecting member 45 is removed from the assistant point member 35 by a user, resisting the magnetic attraction between the magnet 64 and the iron ring 78.

Note that, the standard point members 31, 34, 36 and the assistant point members 32, 33 are identical to the assistant point ember 35. Further, the non-reflecting members 41, 42, 43, 44 and 46 are identical to the non-reflecting member 45. Namely, each of the non-reflecting members is attachable to or removal from the corresponding standard point member. As each of the non-reflecting members is removable from the corresponding standard point member, the target 10 is handy to carry.

Further, when the target 10 is utilized, the non-reflecting members are respectively mounted on the corresponding standard point members, so that each of the reflecting sheets (68) is surrounded by the non-reflecting shoot (74). Photogrammetric analytic measurement may be performed under a situation in which an amount of luminance is not ideal for photographing, for example, in rain or at nighttime. Also, the measurement may be performed at a spot, in which a surface of a road reflects incident light. However, even if photographing is performed under such adverse conditions, areas of the standard point members 31, 34, 36 and the assistant point members 32, 33, 35 can be viewed clearly in photographed pictures, as each of the reflecting sheets is surrounded by the non-reflecting sheet.

Note that, the ratio between the diameter of the assistant point member 35 and the diameter of the non-reflecting member 45, namely an amount of area of each of the reflecting sheet 68 and the non-reflecting sheet 74, is not restricted to this embodiment. It is just required that the reflecting sheet 68 is large enough for being able to be viewed clearly in photographed pictures. Further, the assistant point member 35 and the non-reflecting member 45 may have any shape other than a circle.

Figure 11:
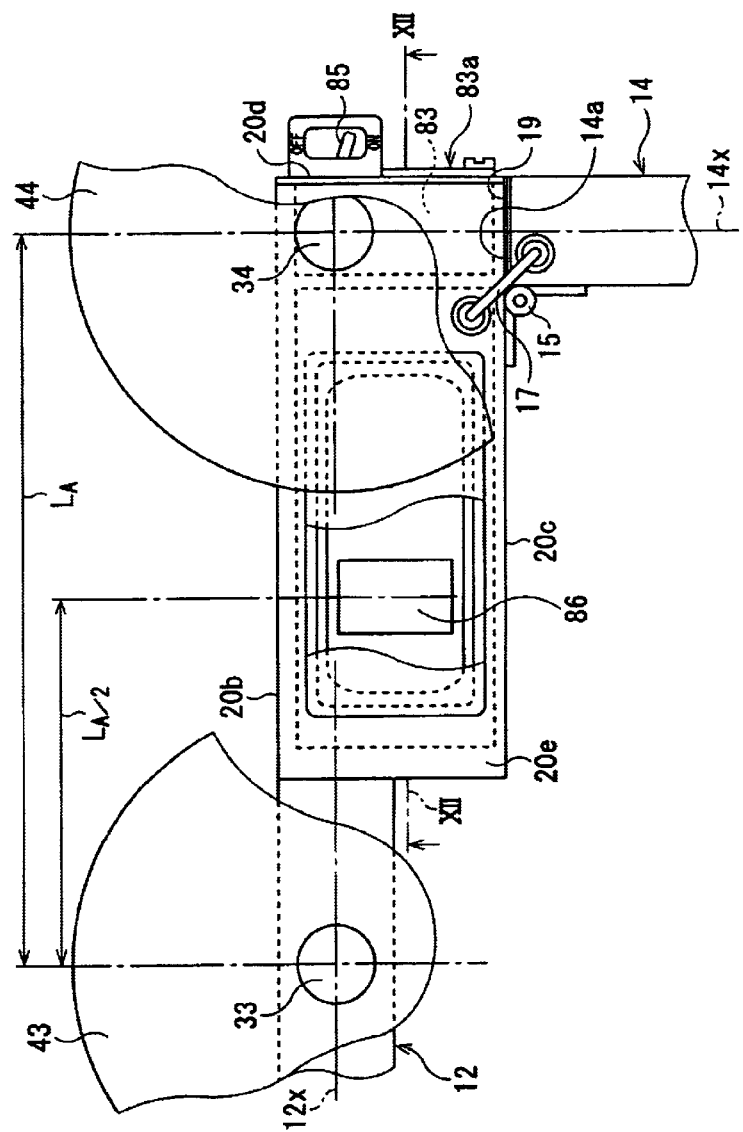
FIG. 11 is an enlarged view of a control unit box of the target.
Figure 12:
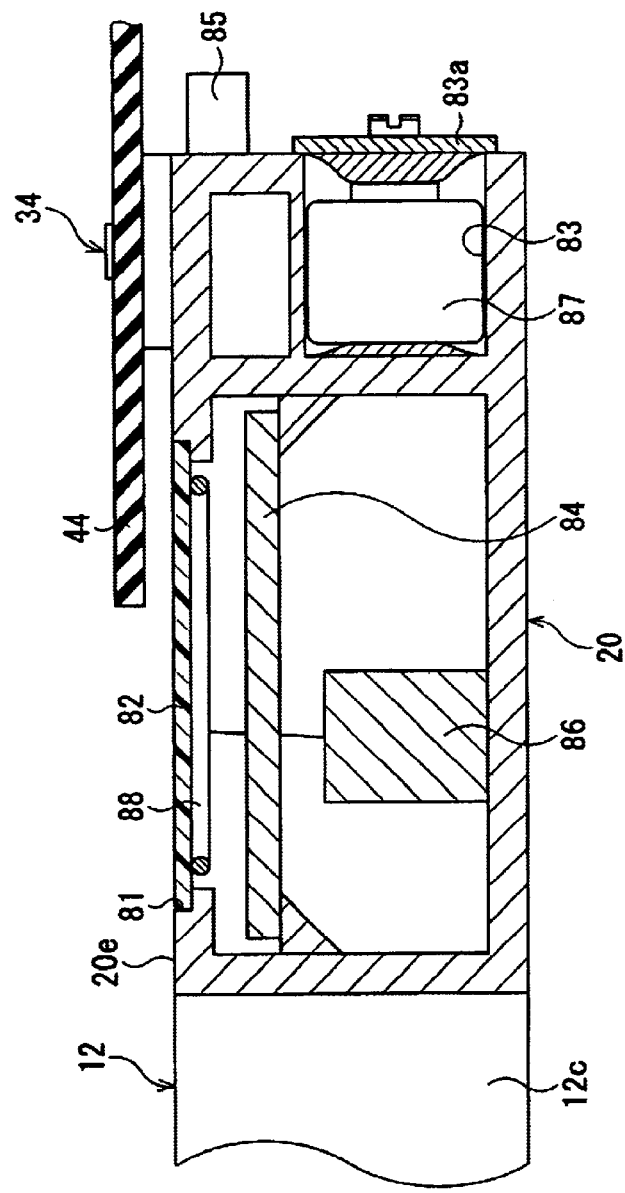
FIG. 12 is a sectional view of the control unit box of FIG. 11.

FIG. 11 shows an enlarged view of the controlling unit box 20 and any other members close to the box 20, with portions broken away for clarity. FIG. 12 is a sectional view of the controlling unit box 20, taken in the direction of the arrows substantially along the line XII—XII of FIG. 11. In FIG. 12, the construction of the controlling unit box 20 is simplified.

The controlling unit box 20 comprises a battery room 83. The battery room 83 is positioned at the side of the side surface 20d. A battery 87, which supplies an electric power to the target 10, is installed in the battery room 83. The battery roam 83 has an opening at the side of the side surface 20d. The opening is closed by a cover 83a. A switch 85 is unitarily mounted on the side surface 20d. The power supply to the target 10 is stopped and started by manipulation of the switch 85.

An opening 81 is formed at the top surface 20e of the controlling unit box 20. The opening 81 is closed by a cover 82. The cover 82 is made of a material through which an electric wave can transmit, for example, resin material. An antenna 88 is mounted on an inner surface of the cover 82, in such a manner that the antenna 88 is wound along the periphery of the cover 92. In the controlling unit box 20, a control board 84 and an azimuth sensor 86 are mounted. The azimuth sensor 86 and the tilt sensors 52, 54 are connected to the control board 84, whereby the operation of the sensors is controlled by the control board 84.

As is apparent from FIG. 11, the azimuth sensor 86 is placed between the assistant point member 33 and the standard point member 34. Namely, when the distance between the assistant point member 33 and the standard point member 34 is $L_A$, the distance between the center of the azimuth sensor 86 and the assistant point member 33 is $L_A/2$.

The sensing of the azimuth sensor 86 is affected by a magnetic material placed close to the sensor 86, for example, the controlling unit box 20 and the battery 87. Further, as the non-reflecting members 41, 42, 43, 44, 45 and 46 are respectively attached to the members 31, 32, 33, 34, 35 and 36 by magnetic force, by which the sensing of the azimuth sensor 86 may be affected. If the sensing of the azimuth sensor 86 is affected by the magnetic force, it is necessary to compensate azimuth data sensed by the azimuth sensor 86. However, as described above, the azimuth sensor 86 is intermediately placed between the assistant point member 33 and the standard point member 34. Namely, at the portion where the sensor 86 is placed, an influence of the magnetic force generated around the assistant point member 33 and the standard point member 34 is at a minimum. Accordingly, the effect on the sensing of the azimuth sensor 86 is negligible.

Based on the azimuth sensed by the azimuth sensor 86, in the aforementioned photogrammetric analytic measurement, the Z' axis of the X'-Z' plane which is the standard plane can be set to the North. When an area of a traffic accident spot is extensive, the traffic accident spot is divided into a plurality of photographing spots, and the photogrammetric analytic measurement is performed at each of photographing spots. If the Z' axis is set to the North in survey maps made at each of the photographing spots, the survey maps can be easily and accurately linked.

When the switch .85 is turned ON to start the power supply, the sensors 52 and 54 measure the angle and the azimuth sensor measures the azimuth at regular intervals in accordance with a control pulse output from the control board 84. Data measured by the sensors 52, 54 and 86 is output to the control board 84. After the data is subjected to predetermined operations, for example, compensation, in the control board 84, the data is transmitted to a receiver from the antenna 88 by wireless. The receiver is mounted on an external device, for example, a digital camera (not shown).

As described above, the antenna 88 is placed on the inner surface of the cover 82. As the cover 82, the non-reflecting member 43, 44 are made of the material through which an electric wave can transmit, the electric wave output from the antenna 88 is transmitted to the receiver, without being interrupted by the cover 82 and the non-reflecting member 43, 44.

As described above, if the receiver is mounted in the digital camera, the tilt angle data, the azimuth and image data photographed by the digital camera are saved to a recording medium. By inputting such data to a computer from the recording medium, processing of the image data can be performed in the computer more rapidly, so that a survey map can be made more accurately.

Figure 13:
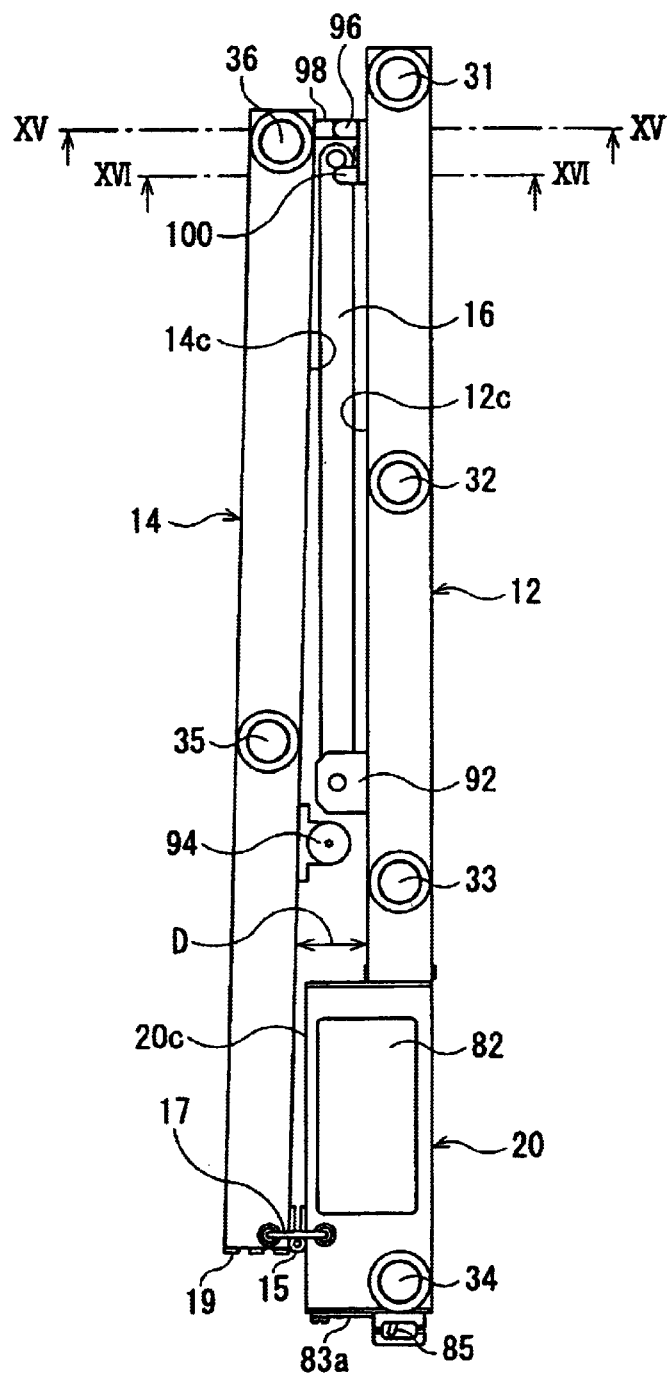
FIG. 13 is a plane view of the target in a folded state.
Figure 14:
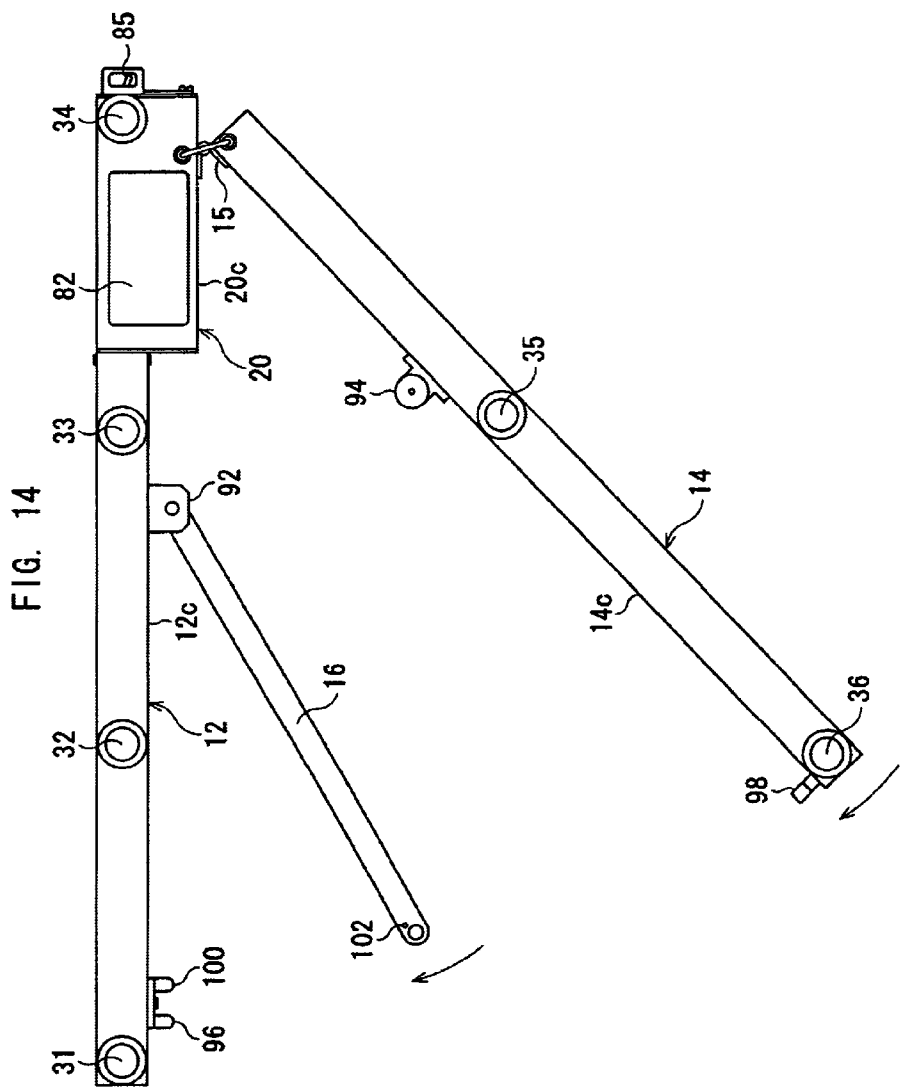
FIG. 14 is a plane view of the target in a state of change from the operational state to the folded state.

FIG. 13 a plane view of the target 10 which is folded. FIG. 14 shows the target 10 on a process in which the unfolded target 10 shown in FIG. 7 is transformed into the folded target 10 shown in FIG. 13.

As described above, when the target 10 is utilized for the photogrammetric analytic measurement, the target 10 is assembled so as to be the L-shaped figure as shown in FIG. 7, and when the target 10 is not utilized, for example, when the target 10 is carried, the target 10 is folded so as to be an I-shaped figure as shown in FIG. 13. A procedure of folding the target 10 is performed below.

Firstly, the non-reflecting members 41, 42, 43, 44, 45 and 46 are removed. Then, one end of the stay 16 is disengaged from the lock hinge 94 of the second bar 14, so that the stay 16 becomes rotatable pivotally around the stay hinge 92, and the second bar 14 becomes rotatable pivotally around the hinge 15.

Next, the stay 16 and the second bar 14 are rotated clockwise, i.e. a direction indicated by arrows in FIG. 14, so as to be positioned approximately parallel to the first bar 12. The rotational movement of the second bar 14 is stopped by the controlling unit box 20. As described above, the side surface 20c of the controlling unit box 20 is offset in the direction opposite to the side surface 20b. Accordingly, an interval D is produced between the first and second bars 12, 14. The stay 16 is positioned in the interval D. Namely, the interval D is effectively utilized. As shown in FIG. 13, the lock hinge 94 is positioned offset from the stay hinge 92 in a direction towards the controlling unit box 20, when the target 10 is folded. Accordingly, when the second bar 14 is rotated, the stay hinge 92 and the stay 16 are not hit by the lock hinge 94.

On the side surface 12c of the first bar 12, a first ball-plunger 96 is mounted adjacent to the standard point member 31. A keeper 98 is mounted adjacent to the standard point member 36, on the side surface 14c of the second bar 14. The ball-plunger 96 and the keeper 98 are engaged with each other, so that the second bar 14 is fixed to the first bar 12.

Figure 15:
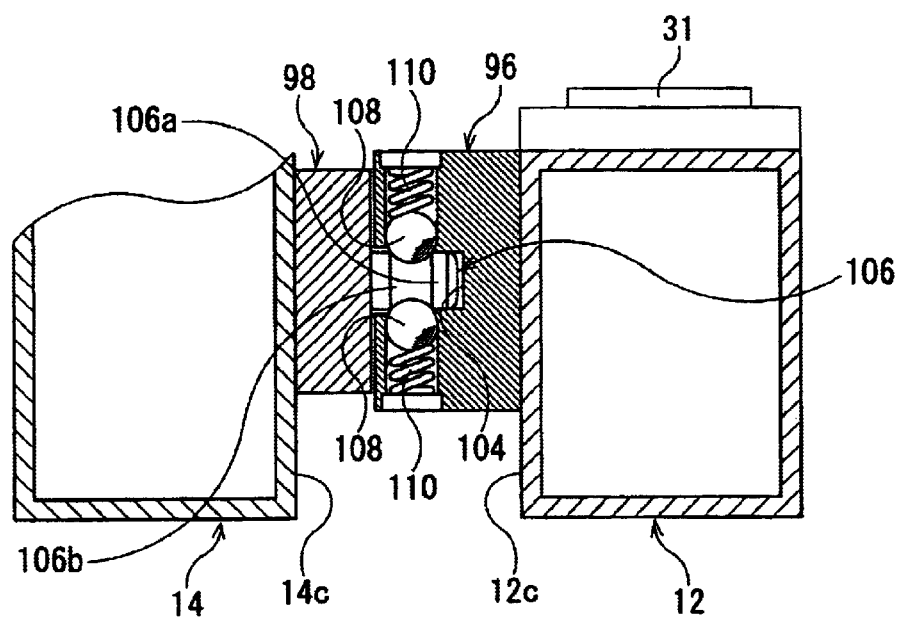
FIG. 15 is a sectional view of FIG. 13 along line XV—XV.

FIG. 15 is a sectional view, taken in the direction of the arrows substantially along the line XV—XV of FIG. 13, showing a lock mechanism of the first and second bars 12, 14. A concave portion 104 is formed on a surface of the ball-plunger 96, which is opposite to a surface attached to the first bar 12. A projecting portion 106, comprising a tip 106a and a waist 106b, is unitarily formed on a surface of the keeper 98, which is opposite to a surface attached to the second bar 14. A 94 thickness of the tip 106a is generally larger than a thickness of the waist 106b. The projecting portion 106 can be engaged with the concave portion 104. Namely, a largest thickness of the tip 106a is slightly smaller than a width of the concave portion 104. Two balls 108 face each other with the waist 106b therebetween. An outer surface of the waist 106b is shaped so as to contact with the outer surface of the balls 108. Each of the balls 108 is urged by springs 110 in a direction towards the concave portion 104.

When the projecting portion 106 of the keeper 98 is inserted into the concave portion 104, the balls 108 are moved by the tip 106a in a direction parting from the concave portion 104, against the urging force of the springs 110. Then, the projecting portion 106 is further moved in a direction towards the bottom of the concave portion 104, each of the balls 108 are moved by the urging force of the springs 110 to come into contact with the outer surface of the waist 106b. Accordingly, the projecting portion 106 is held by the balls 108.

With the engagement of the first ball-plunger 96 and the keeper 98, the second bar 14 is fixed to the first bar 12. Note that, in order to disengage the keeper 98 from the first ball-plunger 96, the second bar 14 is pulled in a direction parting from the first bar 12.

Figure 16:
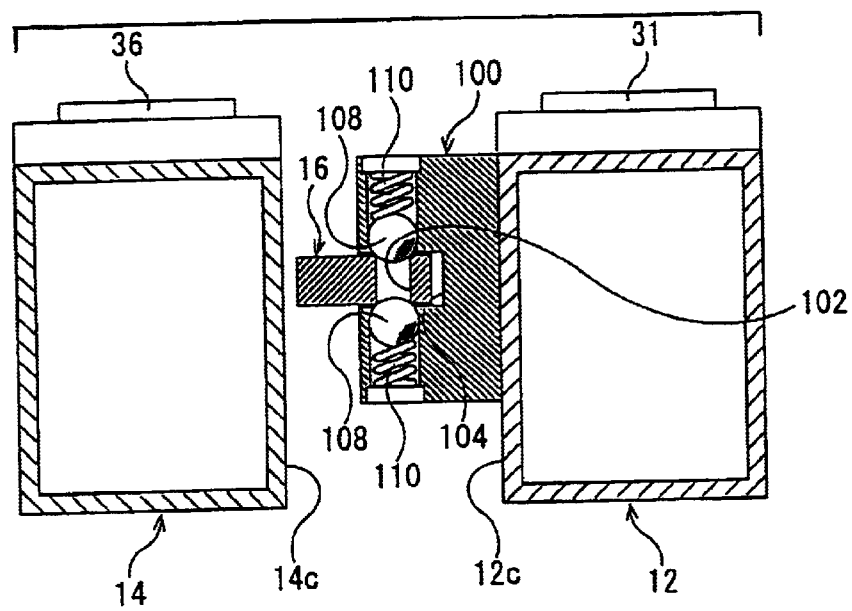
FIG. 16 is a sectional view of FIG. 13 along line XVI—XVI.

FIG. 16 a sectional view, taken in the direction of the arrows substantially along the line XVI—XVI of FIG. 13, showing a lock mechanism of the stay 16. The lock mechanism of the stay 16 has a generally similar to the construction of the lock mechanism shown in FIG. 15. In FIG. 16, components utilized in the lock mechanism of FIG. 15, which are identical in the lock mechanism of the stay 16, share the same reference numerals.

A second ball-plunger 100 is mounted on the side surface 12c of the first bar 12. The second ball-plunger 100 is positioned adjacent to the first ball-plunger 96 on the side of the controlling unit box 20, namely on the opposite side to the tip of the first bar 12 with the first ball-plunger 96 therebetween (see FIG. 14). A thickness of the stay 16 is slightly smaller than the width of the concave portion 104. A fixing hole 102 is formed at the tip of the stay 16.

When the stay 16 is inserted into the concave portion 104, the balls 108 are moved by the stay 16 in the direction parting from the concave portion 104, against the urging force of the springs 110. Then, as the stay 16 is further moved in the direction to the bottom of the concave portion 104, each of the balls 108 are moved by the urging force of the springs 110, so that one portion of each of the balls 108 is pushed into the fixing hole 102 and the balls 108 are respectively fit with openings of the fixing hole 102. Accordingly, the stay 16 is held by the balls 108 which are respectively urged by the springs 110, so that the stay 16 is fixed to the first bar 12. Note that, in order to disengage the stay 16 from the second ball-plunger 100, the stay 16 is pulled in a direction parting from the first bar 12.

As described above, the target 10 is provided with the lock mechanisms which respectively fix the second bar 14 and ;D the stay 16 to the first bar 12 when the target 10 is folded. Accordingly, when the target 10 is carried while being folded in an I-figure, the stay 16 and the second bar 14 are not unexpectedly rotated in a direction opposite to the first bar 12, so damage of the target 10 is avoided.

When the folded target 10 shown in FIG. 13 is unfolded, the keeper 98 is disengaged from the first ball-plunger 96 and the stay 16 is disengaged from the second ball-plunger 100. Next, the second bar 14 is rotated pivotally around the hinge 15 by 90°, so that the elastic member 19, mounted on the end surface 14a, comes into contact with the side surface 20c of the controlling unit box 20 (see FIG. 11). Then, the stay 16 is rotated pivotally around the stay hinge 92, 80 that the end of stay 16 is engaged with the lock hinge 94. Accordingly, the first and second bars 12, 14 are connected by the stay 16, maintaining the positional relationship as shown in FIG. 7.

Figure 17:
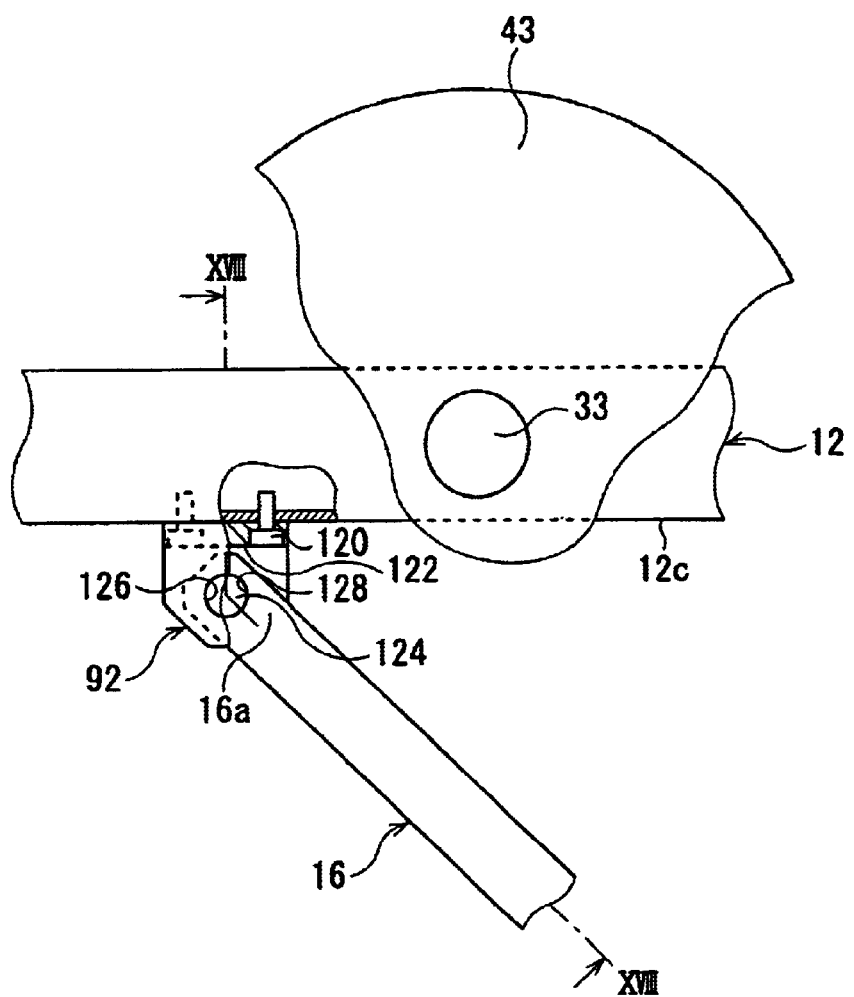
FIG. 17 is a plane view of a construction adjacent to a hinge, with portions broken away for clarity, which is an enlarged view of FIG. 7.
Figure 18:
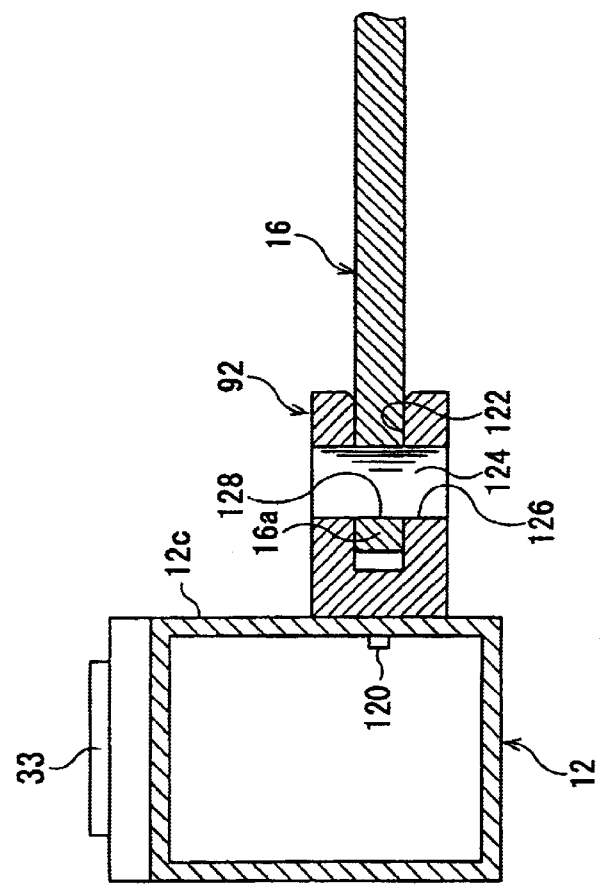
FIG. 18 is a sectional view of the hinge of FIG. 17.

FIG. 17 is a plane view of a construction close to the stay hinge 92, with portions broken away for clarity, which is a partially enlarged view of FIG. 7. FIG. 18 is a sectional view taken in the direction of the arrows along the line XVIII—XVIII of FIG. 17.

The stay hinge 92 in fixed on the side surface 12c of the first bar 12 by a screw 120, being positioned between the em assistant point members 32 and 33 (see FIG. 7). A slot 122 is formed in the stay hinge 92. An end portion 16a of the stay 16 is engaged with the slot 122. The width of the slot 122 is slightly larger than the thickness of the stay 16.

A supporting hole 126 is formed in the stay hinge 92. A supporting hole 128 is formed in the end portion 16a. The stay 16 is positioned such that a central axis of the supporting hole 128 is coaxial with a central axis of the supporting hole 126. A supporting pin 124 in press-fitted in the supporting hole 126, being received by the supporting hole 128, so that the stay 16 is rotatable pivotally around an axis of the supporting pin 124 in the slot 122.

Figure 19:
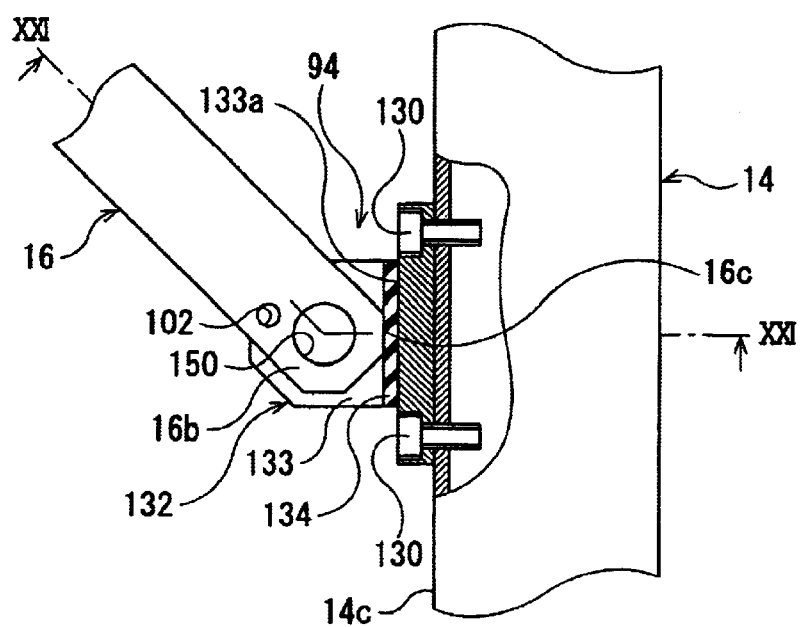
FIG. 19 is a plane view of a construction adjacent to another hinge, with portions broken away for clarity, which is an enlarged view of FIG. 7.
Figure 20:
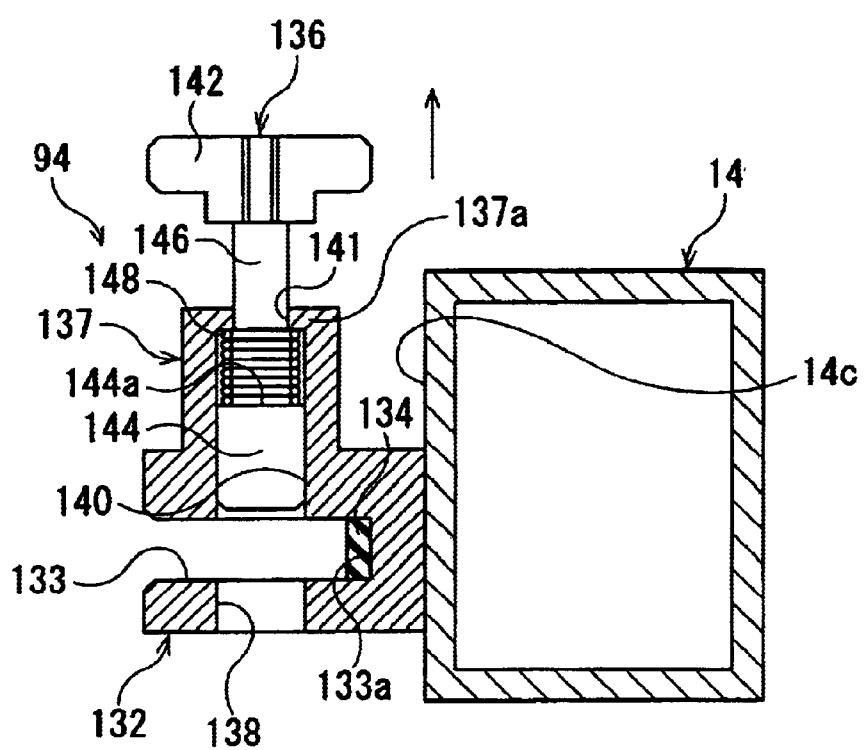
FIG. 20 is a sectional view showing a state before a stay becomes engaged with the another hinge.
Figure 21:
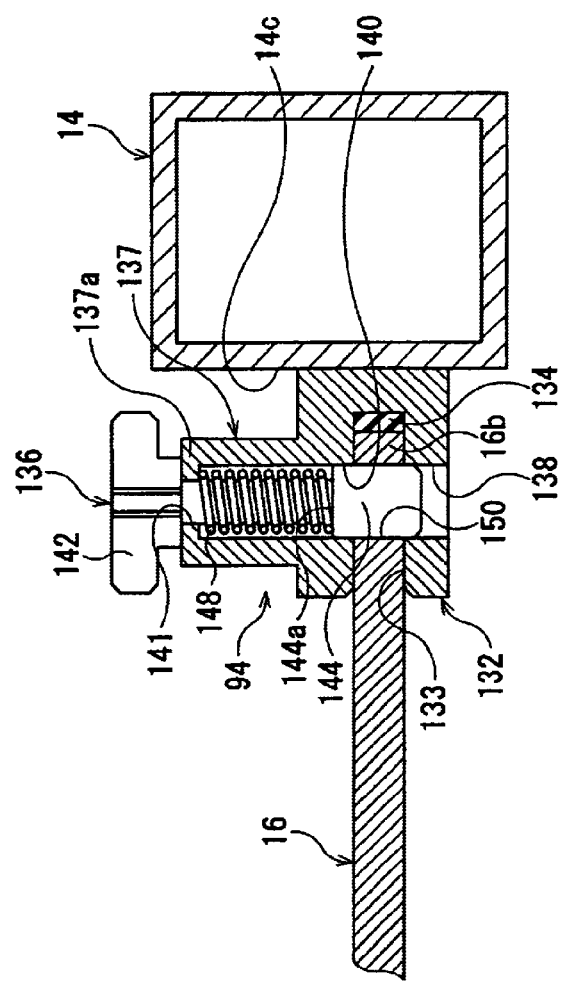
FIG. 21 is a sectional view showing a state in which the stay is engaged with the another hinge.

FIG. 19 is a plane view of a construction close to the lack hinge 94, with portions broken away for clarity, which is a partially enlarged view of FIG. 7. FIG. 20 is a sectional view showing a state before the stay 16 becomes engaged with the lock hinge 94. FIG. 21 is a sectional view showing a state in which the stay 16 is engaged with the lock hinge 94, taken in the direction of the arrows along the line XXI—XXI of FIG. 19.

The lock hinge 94 is fixed on the side surface 14c of the second bar 14 by screws 130, being positioned between the assistant point member 35 and the standard point member 34 (see FIG. 7). The lock hinge 94 comprises a stay supporting portion 132 and a pin receiving portion 137. A slot 133 is forced at the stay supporting portion 132. A guide member 134 is bonded on a side surface 133a of the stay supporting slot 133, which is parallel to the side surface 14c. The guide member 134 is made of elastic material, for example, rubber sheet or sponge. Note that, the guide member 134 may be a spring member which urges a plate, mounted so as to be parallel to the side surface 132a, in a direction opposite to the side surface 133a. As the width of the slot 133 is slightly larger than the thickness of the stay 16, an end portion 16b of the stay 16 is attachable to and removable from the slot 133.

A hole 138 is formed at a bottom wall of the stay supporting portion 132, for receiving a lock pin 136. Similarly, a hole 140, for receiving the lock pin 136, is formed in the pin receiving portion 137 and at an upper wall of the stay supporting portion 132. An inner diameter of the hole 138 and an inner diameter of the hole 140 equal each other. Further, a central axis of the hole 138 and a central axis of the hole 140 are coaxial with each other. Namely, from an upper wall 137a of the pin receiving portion 137 to the bottom wall of the stay supporting portion 132, one hole is continuous. An opening 141 of the hole 140, formed at the upper wall 137a, has a smaller diameter than that of the hole 140.

The lock pin 136 comprises a head 142, an engaging shaft 144 and a connecting shaft 146. A diameter of the engaging shaft 144 approximately equals the diameter of the holes 138, 140. The connecting shaft 146 connects the head 142 and the engaging shaft 144. A diameter of the connecting shaft 146 approximately equals the diameter of the opening 141. In the hole 140, a coil spring 148 is wound around the connecting shaft 146. One end of the coil spring 148 is contact with an inner surface of the upper wall 137a, and another end of the coil spring 148 is contact with an upper surface 144a of the engaging shaft 144. Accordingly, the coil spring 148 urges the lock pin 136 in a downward direction, due to the pressure on the engaging shaft 144.

The lock pin 136 is received by the holes 138 and 140, being movable along the axis thereof. When the head 142 is pulled up by an externally applied force, the coil spring 148 is compressed in accordance with the rising of the upper surface 144a, and the lock pin 136 is moved to a position shown in FIG. 20. As shown in FIG. 20, an end of the engaging shaft 144 is positioned above the stay supporting slot 133. Accordingly, the stay 16 can be inserted into the stay supporting slot 132.

A lock hole 150 is formed at an end portion 16b of the stay 16. An inner diameter of the lock hole 150 is slightly larger than an outer diameter of the engaging shaft 144. The stay 16 has an inclined face 16c at the end portion. The inclined face 16c inclines to a longitudinal axis of the stay 16 when the stay 16 is inserted into the slot 133, the inclined face 16c slides along the guide ember 134, pressing the guide member 134.

Maintaining the position of the lock pin 136 shown in FIG. 20, the stay 16 is slid in the slot 133 so that a central axis of the lock hole 150 is coaxial with the central axon of the holes 138, 140. After the central axis of the lock hole 150 becomes coaxial with the central axes of the holes 138 and 140, the supply of the external force pulling up the head 142 is stopped. Then, the lock pin 136 is moved along the axis by the urging force of the coil spring 148. Namely, the lock pin 136 pierces through the hole 140 to engage with the hole 138, as shown in FIG. 21. Further, as descent of the head 142 is stopped by the upper wall 137a, it is prevented that the lock pin 136 falls through the look hinge 94.

As described above, the stay 16 is fixed to the second bar 14 by the engagement of the lock pin 136 and the lock hole 150. Accordingly, the first and second bars 12, 14 are unitarily connected by the stay 16.

The elastic member 19 is provided between the controlling unit box 20 and the second bar 14, and the guide member 134 is provided between the stay 16 and the second bar 14. Accordingly, the connection of the first and second bars 12, 14 via the stay 16 becomes stable, so that accuracy of measurements of the stay 16 is heightened.

After the first and second bars 12, 14 are connected by the stay 16, the non-reflecting members 41, 44 and 46 are respectively set to the standard point members 31, 34 and 36, and the non-reflecting members 42, 43 and 45 are respectively set to the assistant point members 32, 33 and 35. Then, the target 10 comes operational as shown in FIG. 7 to be utilized for the photogrammetric analytic measurement.

As described above, according to this embodiment, in the operational position of the target 10, the assistant point members 32 and 33 are positioned on the line which connects the standard point members 31 and 34, and the assistant point member 35 is positioned on the line which connects the standard point members 34 and 36. Namely, on each of the lines, a number of the assistant point member is different. Accordingly, even if the first and second bars 12, 14 are unclearly visible in the photographed pictures, the confirmation of the positional relationship between the standard point members 31, 34 and 35 is facilitated.

Further, the standard point members 31, 34 and the assistant point members 32, 33 are positioned at equal spaces on the line connecting the standard point members 31 and 34, and the standard point members 34, 36 and the assistant point member 35 are positioned at equal spaces on the line connecting the standard point members 34 and 36. Accordingly, the automatic extraction of the standard points is facilitated, so that the camera positions, at which the pictures are photographed, are automatically calculated.

In the operational position, the hinges 15, 92, 94 and the first and second ball-plungers 96, 100 and the keeper 98 are respectively covered by the non-reflecting members 41, 42, 43, 44, 45 and 46, precluding them from being photographed in the pictures. Accordingly, the determination of the standard point members 31, 34, 36 and the assistant point members 32, 33, 35, becomes more facilitated, so that the accuracy of the photogrammetric analytic measurement becomes heightened.

In the target 10, the standard point members 31, 34, 36 and the assistant point members 32, 33, 35 are covered by the reflecting sheet, and these members are respectively surrounded by the non-reflecting members 41, 42, 43, 44, 45 and 46, so that the members are emphasized. Accordingly, the discrimination of the standard point members 31, 34 and 36 in the photographed pictures becomes facilitated, heightening the accuracy of the photogrammetric analytic measurement.

Further, the non-reflecting members 41, 42, 43, 44, 45 and 46 are removal and attachable, and the target 10, which has the L-shaped figure in the operational position, is able to be folded in the I-shaped figure. When the target 10 is in the operational position, the first and second bars 12, 14 are fixed by the stay 16, so that accurate measurements of the target 10 can be obtained. When the target 10 is folded in the I-shaped figure, the stay 16 and the second bar 14 are respectively fixed to the first bar 12 by the first and second ball-plungers 96, 100. Accordingly, the target 10 is handy to carry.

An described above, according to the present invention, the target for the photogrammetric analytic measurement, which enables positions of camera to be automatically calculated by being photographed with an object, can be obtained.

The present disclosure relates to subject matter contained in the following Japanese Patent Application No. 10-277333 (filed on Sep. 30, 1998) and No. 10-281004 (filed on Oct. 2, 1998), which are expressly incorporated herein, by reference, in their entirety.

What is claimed is:

1. A target for photogrammetric analytic measurement, which is photographed with an object by a camera in said photogrammetric analytic measurement, said target having standard points that are clearly discerned in a photographed picture, and a calculation of photographing positions of said camera being performed by determining a positional relationship of each of said standard points in said photographed pictures, said target comprising:

a first standard point member defining a first standard point included in said standard points;

a second standard point ember defining a second standard point included in said standard points;

a third standard point member defining a third standard point included in said standard points; and assistant point members respectively defining assistant points that are clearly discerned in said photographed picture;

wherein distances between each of said first standard point and said second standard point and said third standard point, are predetermined;

a first straight line connecting said first standard point and said second standard point, and a second straight line connecting said second standard point and said third standard point are inclined at a predetermined angle; and at least one of said assistant points are positioned on said first straight line and said second straight line.

2. The target of claim 1, wherein a distance between said first standard point and said second standard point equals a distance between said second standard point and said third standard point.

3. The target of claim 1, wherein said predetermined angle is right angle.

4. The target of claim 1, wherein, said first standard point, said second standard point and said at least one of said assistant points being positioned on said first straight line, are positioned at equal spaces on said first straight line, and said second standard point, said third point and said at least one of said assistant points being positioned on said second straight line, are positioned at equal spaces on said second straight line.

5. The target of claim 4, wherein a number of said assistant points on said first straight line is different from a number of said assistant points on said second straight line.

6. The target of claim 5, wherein said number of said assistant points on said first straight line is two, and said number of said assistant points on said second straight line is one.

* * * * *